(12) United States Patent
He et al.

(10) Patent No.: US 8,378,015 B2
(45) Date of Patent: Feb. 19, 2013

(54) HOT MELT ADHESIVES CONTAINING STYRENE BUTADIENE BLOCK COPOLYMER

(75) Inventors: Qiwei He, Belle Mead, NJ (US); Yuhong Hu, Belle Mead, NJ (US); Alethea Pollock, Franklin Park, NJ (US); Justin Mehaffy, Flemington, NJ (US); Michael G. Harwell, Dusseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 267 days.

(21) Appl. No.: 12/705,742

(22) Filed: Feb. 15, 2010

(65) Prior Publication Data

US 2010/0210163 A1 Aug. 19, 2010

Related U.S. Application Data

(63) Continuation of application No. PCT/US2008/073103, filed on Aug. 14, 2008.

(60) Provisional application No. 61/007,923, filed on Aug. 17, 2007.

(51) Int. Cl.
*B60C 1/00* (2006.01)
(52) U.S. Cl. ......... 524/505; 524/575; 428/375; 428/521
(58) Field of Classification Search .................. 524/505, 524/575; 428/375, 521
See application file for complete search history.

(56) References Cited

U.S. PATENT DOCUMENTS

| 3,700,633 | A | | 10/1972 | Wald et al. |
| 3,932,327 | A | | 1/1976 | Naylor |
| 4,780,367 | A | | 10/1988 | Lau et al. |
| 5,057,571 | A | * | 10/1991 | Malcolm et al. ............... 524/505 |
| 5,342,685 | A | | 8/1994 | Gobran |
| 5,948,527 | A | | 9/1999 | Gerard et al. |
| 2005/0027071 | A1 | | 2/2005 | Deeter et al. |
| 2008/0070053 | A1 | | 3/2008 | Schmierer et al. |

FOREIGN PATENT DOCUMENTS

| JP | 2006008947 A | 1/2006 |
| WO | 9928405 A1 | 6/1999 |
| WO | 0157153 A1 | 8/2001 |
| WO | 03027182 A1 | 4/2003 |

OTHER PUBLICATIONS

Fu, Hongyong, et al. "Physical Characterization of Sorbitol or Glycerol Containing Aliphatic Copolyesters Synthesized by Lipase-Catalyzed Polymerization," Macromolecules, American Chemical Society, vol. 36, 2003, pp. 9804-9808.
Jurrens L.D. et al. "Butadiene-styrene radial teleblock polymers in p-S hot melt adhesives." Adhesives Age, vol. 18, No. 10, Oct. 1975, pp. 31-34, XP009108268.

* cited by examiner

*Primary Examiner* — Peter D Mulcahy
(74) *Attorney, Agent, or Firm* — Sun Hee Lehmann (57) ABSTRACT

Hot melt adhesive compositions containing hyper-branched SBS block copolymers and end use applications thereof. The hyper-branched SBS is characterized in having a ratio between light-scattering molecular weight (of non-di-block polymer) and GPC molecular weight (of non-di-block polymer) greater than 1.4 and having ratio between light scattering molecular weight molecular weight (of non-di-block polymer) and light scattering molecular weight molecular weight (of di-block polymer) greater than 5. The ratio between light scattering molecular weight MW (of non-di-block polymer) and light scattering molecular weight MW (of di-block polymer) also defines the number of arms for the hyper branched structure. The weight average molecular weight of each arm of the hyper-branched SBS block copolymer is less than about 100,000. These are multipurpose adhesives finding utility as packaging, labeling, construction and positioning adhesives, and are particularly well suited for use as elastic attachment adhesives in the manufacture of elastic-containing products, such as disposable absorbent elastic articles.

18 Claims, 1 Drawing Sheet

HOT MELT ADHESIVES CONTAINING STYRENE BUTADIENE BLOCK COPOLYMER

CROSS-REFERENCE TO RELATED APPLICATIONS

This application is a continuation of International Application No. PCT/US2008/073103 filed Aug. 14, 2008, which claims the benefit of U.S. Provisional Patent Application No. 61/007,923 filed Aug. 17, 2007, the contents of both of which are incorporated herein by reference.

FIELD OF THE INVENTION

The invention relates to multipurpose adhesive compositions, and more particularly to rubber-based hot melt adhesives comprising a specific type of polystyrene-polybutadiene-polystyrene (SBS) block copolymer. The adhesives of the invention are useful as construction adhesives for e.g., for the manufacture of disposable goods, are particularly well suited for use in elastic attachment applications, and may advantageously be used in pressure sensitive end use applications such as, for example, label, tape and graphic applications.

BACKGROUND OF THE INVENTION

Hot melt adhesives are applied to a substrate while in its molten state and cooled to harden the adhesive layer. Such adhesives are widely used for various commercial and industrial applications such as product assembly and packaging, and have been widely used in the non-woven industry to make baby diapers and adult incontinence products. In these applications, adhesive is applied to at least one substrate such as, for example, a packaging substrate (e.g., cardboard), a non-woven substrate (e.g., polyolefin), or an elastic substrate (e.g., spandex) for binding the substrate to a second similar or different.

A pressure sensitive adhesive is permanently tacky at room temperature and can adhere to a substrate with very light pressure. In other words, it has an infinite open time to enable bonding to the adherent. A hot melt PSA is one type of PSAs that is manufactured and processed at high temperatures in its molten state, and exhibits PSA characteristics after being cooled down and solidified into solids. Styrenic block copolymers such as styrene-isoprene-styrene (SIS) and styrene-butadiene-styrene (SBS) have been used commercially as base polymers for hot melt PSAs. In a hot melt PSA formulation, base polymer provides cohesive strength and elasticity. The use of high molecular weight polymer or high polymer content usually promotes cohesive strength and adhesion, however, it also results in significant melt viscosity increase. A hot melt adhesive with high viscosity may require very high processing temperature, at which polymers are susceptible to degradation, charring, gelling and loss of adhesion. High processing temperature is also not preferred for safety concern and cost concern.

While hot melt adhesives are conventionally used a number of industries, there is a need for a high cohesive strength hot melt pressure sensitive adhesive with low melt viscosity that can be used to bond various types of substrates for certain end use applications. The current invention addresses this need.

SUMMARY OF THE INVENTION

It has been discovered that SBS block copolymers possessing a hyper-branched structure may be used in the manufacture of multipurpose adhesives. Such adhesives find utility as packaging, labeling, construction and positioning adhesives, and are particularly well suited for pressure sensitive applications and for use as elastic attachment adhesives in the manufacture of elastic-containing products, such as disposable absorbent elastic articles.

Hot melt adhesives of the invention comprise an SBS-block copolymer, which copolymer has a hyper-branched structure. The hyper-branched SBS is characterized in having a ratio between light-scattering MW (of non-di-block polymer) and GPC MW (of non-di-block polymer) greater than 1.4 and having a ratio between light scattering molecular weight MW (of non-di-block polymer) and light scattering molecular weight MW (of di-block polymer) greater than 5. The ratio between light scattering molecular weight MW (of non-di-block polymer) and light scattering molecular weight MW (of di-block polymer) also defines the number of arms of the hyper-branched structure. The weight average molecular weight of each arm is less than about 100,000. The weight average molecular weight of each arm of the hyper-branched SBS block copolymer used in the practice of the invention will more typically be between about 20,000 to about 80,000.

The hyper-branched SBS block copolymer used in the adhesives of the invention will comprise at least about 5 arms. In one embodiment, the adhesive contains a hyper-branched SBS block copolymer that comprises at least about 10 arms. In another embodiment, the adhesive contains a hyper-branched SBS block copolymer that comprises at least about 14 arms. The styrene content of the hyper-branched SBS-block will typically be at least 20 wt %, more typically at least about 25 wt %.

In addition to the hyper-branched SBS-block copolymer, the adhesive optionally may also comprise SIS or any other non-hyper-branched SBS including SBS, SEBS, SEPS, SIBS, SI/BS, SBR, or a combination thereof, a tackifying resin and, optionally a liquid plasiticizer and/or wax. In one embodiment, the adhesive comprises 2 to 40% of a hyper-branched SBS-block copolymer, 2 to 25% of a linear, radial or random SIS, SBS, SEBS, SEBS, SEPS, SIBS, SI/BS, SBR or any combination thereof, 30 to 70% of a tackifier, up to about 25% of a liquid plasticizer, and up to about 10% wax.

The invention also relates to article of manufacture comprising these hot melt adhesives and a substrate. In one embodiment, the substrate comprises an elastomeric fiber. In another embodiment the substrate is a nonwoven substrate. In yet another embodiment, the substrate is a packaging substrate. Articles of the invention include disposable nonwoven and disposable elastic articles (e.g., diapers, etc) and pressure sensitive adhesive article (e.g., tape, label, etc.).

The invention also relates to a process for bonding a substrate to a similar or dissimilar substrate comprising applying to at least a first substrate a molten hot melt adhesive composition, bringing at least a second substrate in contact with the adhesive present on the first substrate whereby said first and second substrates are bonded together. In one embodiment, at least one of said first and/or said second substrate is an elastomeric polyurethane fiber (spandex).

DETAILED DESCRIPTION OF THE INVENTION

All documents cited herein are incorporated in their entireties by reference.

The invention relates to a pressure sensitive adhesive (PSA), and more particularly to the rubber based hot melt PSAs comprising a specific hyper branched polystyrene-polybutadiene-polystyrene (SBS) block copolymer. The adhesive of the invention is advantageously used in pressure sensitive end use applications such as tapes, decals, graphics, container labeling, package labels, and positioning adhesives for femcare products.

The present invention provides a hot melt adhesive composition that comprises an SBS-block copolymer, which copolymer has a hyper-branched structure. The hyper-branched block copolymer may be represented by the structure $(PS-PB)_nX$, where PS is polystyrene, PB is polybutadiene, X is a residue of a coupling agent used in the production of the radial block copolymer, and n represents the number of PS-PB arms appended to X. Hyper-branched SBS block copolymers of this structure may be prepared by oligomer modified anionic polymerization methods described in published US patent application 2005/0027071 A1. Such block copolymers are commercially available from Dynasol.

The hyper-branched SBS block copolymer is characterized in having a ratio between light-scattering molecular weight (of non-di-block polymer) and GPC molecular weight (of non-di-block polymer) greater than 1.4 and having ratio between light scattering molecular weight molecular weight (of non-di-block polymer) and light scattering molecular weight molecular weight (of di-block polymer) greater than 5. The ratio between light scattering molecular weight MW (of non-di-block polymer) and light scattering molecular weight MW (of di-block polymer) also defines as the number of arms for the hyper branched structure. The weight average molecular weight of each arm is less than about 100,000. The weight average molecular weight of each arm of the hyper-branched SBS block copolymer used in the practice of the invention will more typically be between about 20,000 to about 80,000.

Light scattering molecular weight and GPC molecular weight were determined by the methods detailed in Example 1.

The hyper-branched SBS block copolymer used in the adhesives of the invention will contain at least 5 arms. In one embodiment, the hyper-branched SBS block copolymer contains greater than about 10 arms. In another embodiment, the hyper-branched SBS block copolymer comprises at least about 14 arms. The weight average molecular weight of each arm is less than about 100,000. The weight average molecular weight of each arm of the hyper-branched SBS block copolymer used in the practice of the invention will more typically be between about 20,000 to about 80,000. The styrene content of the hyper-branched SBS-block will typically be at least 20 wt %, more typically at least about 25 wt %.

In addition to the hyper-branched SBS-block copolymer, the adhesive optionally may comprise SIS or any other non-hyper-branched SBS including SBS, SEBS, SEPS, SIBS, SI/BS, SBR, or a combination thereof, a tackifying resin and, optionally a liquid plasiticizer and/or wax. In one embodiment, the adhesive comprises 2 to 40% of a hyper-branched SBS-block copolymer, 2 to 25% of a linear, radial or random SIS, SBS, SEBS, SEBS, SEPS, SIBS, SI/BS, SBR block copolymer or any combination thereof, 30 to 70% of a tackifier, up to about 25% of a liquid plasticizer, and up to about 10% wax.

The hyper-branched SBS block copolymers used in the practice of the invention will typically have a di-block percentage, generally between about 25 wt % and about 75% by weight of the copolymer (coupling efficiency greater than 25%), and preferable less than about 50% by weight of the copolymer (coupling efficiency greater than 50%). Typically, the styrene block components of the hyper-branched SBS block copolymer will be between about 20% to about 50% by weight of the copolymer, more typically the styrene block components of the hyper-branched SBS block copolymer will be greater than 25% by weight of the copolymer. The above styrene block components will be selected based on the desired end use. For example, whereas about 20 wt % will typically be used for pressure sensitive adhesive applications, amounts of about 25 wt % will be more typical when formulating for elastic attachment end use applications.

In more detail, the adhesives of the invention will comprise from about 2 wt % to about 40 wt % of a hyper-branched SBS block copolymer wherein the number of arms are at least 5, more typically greater than 7, and preferably greater than 10. In one embodiment the hyper-branched SBS has at least about 14 arms.

Embodiments of the adhesive in the present invention may desirable also comprise at least one linear, radial or random block copolymer having the general configuration A-B-A wherein the polymer end-blocks A are non-elastomeric polymer blocks which, as homopolymers, have glass transition temperatures above about 20° C., while the elastomeric polymer mid-blocks B are derived from isoprene, butadiene or isobutylene which may be partially or substantially hydrogenated or mixtures thereof.

The non-elastomeric end-blocks A may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, and ethyl vinyl benzene as well as dicyclic monovinyl compounds such as vinyl naphthalene and the like. Other non-elastomeric polymer blocks may be derived from alpha olefins, alkylene oxides, acetals, urethanes, etc. Styrene is preferred.

The elastomeric mid-block B component making up the remainder of the thermoplastic elastomeric copolymer is derived from isoprene or butadiene which may be hydrogenated as taught, for example, in U.S. Pat. No. 3,700,633. This hydrogenation of butadiene may be either partially or substantially complete. Selected conditions may be employed for example to hydrogenate the elastomeric butadiene block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partial or substantially complete. Hydrogenated polymers are preferred to minimize degradation during processing, which is a more severe problem with higher molecular weight polymers.

The adhesive compositions of the invention will typically comprise from about 2 wt % to about 25 wt % of an A-B-A block copolymer or random copolymer. Examples include styrene-isoprene-styrene (SIS), styrene-butadiene-styrene (SBS), styrene-isobutylene styrene (SIBS), styrene-b-isoprene/butadiene-b-styrene (SI/BS), styrene-b-ethylene/butylene-b-styrene (SEBS), styrene-b-ethylene/propylene-b-styrene (SEPS), styrene-butadiene random copolymer (SBR) and combinations thereof.

The adhesives of the invention will typically also comprise from about 30 to about 70 wt % of a tackifying resin, preferably from about 40 to about 70 wt %, more preferably from about 40 to about 65 wt % of a tackifier which is compatible with the midblock of the thermoplastic elastomer. Preferred are tackifiers having a Ring and Ball softening point above about 25° C. Suitable tackifiers include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28,58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives.

Preferred tackifiers for use herein include polyterpenes, aliphatic resins, cycloaliphatic resins, and aliphatic/aromatic or cycloaliphatic/aromatic. More preferred are aliphatic/aromatic or cycloaliphatic/aromatic copolymers and their hydrogenated derivatives. Examples include Wingtack Extra from Goodyear, Piccotac 9095 from Eastman Chemical Company and ECR 179EX from ExxonMobil Chemical Company. The desirability and selection of the particular tackifying agent can depend upon the specific elastomeric block copolymer employed.

Additionally, it may be desirable to incorporate in the adhesive up to about 30 wt % of an end block tackifier resin. End block resins reside predominantly in the non-elastomer blocks of the thermoplastic elastomer after the adhesive is cooled. Representative of such resins are the primarily aromatic resins based on mixed C9 petroleum distillation streams such as materials available from Eastman Chemical Company, or resins based on pure or mixed monomer streams of aromatic monomers such as homo or copolymers of vinyl toluene, styrene, alpha-methyl styrene, coumarone or indene. Preferred are those based on alpha-methyl styrene available from Eastman Chemical Company under the Kristalex and Plastolyn trade names. If present, the end block resin is generally used in an amount of about 1 to about 30 wt %, preferably less than about 20 wt %.

The adhesive may optionally also include an oil or other liquid diluent which is primarily aliphatic in character and is compatible with the thermoplastic elastomer midblock. When present, the compositions of the invention will typically comprise the liquid plasticizer in amounts of less than about 25 wt %. When liquid plasticizer is present, the adhesive will comprise at least about 1 wt %, more typically at least about 5 wt % of a liquid plasticizer. Examples include plasticizers such as paraffinic and naphthenic petroleum oils, highly refined aromatic-free paraffinic and naphthenic food and technical grade white petroleum mineral oils, and liquid tackifiers such as the synthetic liquid oligomers of polybutene, polypropene, polyterpene, etc. The synthetic series process oils are high viscosity oligomers which are permanently fluid liquid monolefins, isoparaffins or paraffins of moderate to high molecular weight. Liquid plasticizing or tackifying diluents include polyterpenes such as Wingtack 10 available from Goodyear, and Escorez 2520 based on a $C_5$ feed stream available from Exxon Chemical. Other liquid diluents include polyisoprene, available as LIR 50 from Kuraray, and Amoco's polybutenes available under the name Indopol. Most preferred are paraffinic oils in combination with Escorez 2520, a polymerized $C_5$ petroleum feed stream.

Also, there may be present a wax such as the polyethylene waxes. If used, the wax is generally present in an amount of at least about 2 wt %, up to about 5%.

Finally, antioxidants typically used in the production of rubber based pressure sensitive adhesives may be present in an amount of up to about 3 wt %. Among the useful stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. Representative hindered phenols include: 1,3,5-trimethyl 2,4, 6-tris(3,5-di-tert-butyl-4-hydroxybenzyl)benzene; pentaerythrityl tetrakis-3(3,5-di-tert-butyl-4-hydroxyphenyl)-propionate; 4,4'-methylenebis(2,6-tert-butylphenol); 4,4'-thiobis(6-tert-butyl-o-cresol); 2,6-di-tert-butylphenol; 6-(4-hydroxyphenoxy)-2,4-bis(n-octylthio)-1,2,5-triazine; di-n-octadecyl3,5-di-tert-butyl-4-hydroxybenzyl phosphonate; 2-(n-octylthio)ethyl 3,5-di-tert-butyl-4-hydroxybenzoate; and sorbitol hexa[3-(3,5-di-tert-butyl-4-hydroxyphenyl)-propionate].

The hot melt adhesive compositions of the invention may be formulated using techniques known in the art. An exemplary procedure involves placing approximately 20% of the oil or liquid diluent with all the thermoplastic polymers, and stabilizers in a jacketed mixing kettle, preferably in a jacketed heavy duty mixer, which is equipped with rotors and thereupon raising the temperature to a range of from up to about 190° C. After the mixture has been melted, the temperature is lowered to 150° to 165° C. Mixing and heating are continued until a smooth, homogeneous mass is obtained whereupon tackifying resin, wax, and the remainder of the diluent are thoroughly and uniformly admixed therewith.

The adhesive may be applied to a desired substrate by any method known in the art, and include, without limitation roll coating, painting, dry-brushing, dip coating spraying, slot-coating, swirl spraying, printing (e.g., ink jet printing), flexographic, extrusion, atomized spraying, gravure (pattern wheel transfer), electrostatic, vapor deposition, fiberization and/or screen printing.

The adhesives of the invention are useful as construction adhesives for e.g., for the manufacture of disposable goods, are particularly well suited for use in elastic attachment applications, and may advantageously be used in pressure sensitive end use applications such as, for example, label, tape and graphic applications.

One of the most important properties required in elastic attachment is its creep performance. As such, an adhesive with excellent toughness is required. The adhesives of the invention meet the rigorous requirements needed in elastic attachment applications and other applications. The adhesives are thus particularly useful in making elastic non-wovens and in the fabrication of baby diapers, training pants, adult incontinence briefs or undergarments, and the like. The adhesive of the invention will typically be applied to the substrate at temperatures of from about 250° F. to about 325° F.

An absorbent structure will typically comprise a nonwoven fabric. A nonwoven fabric is defined as an interlocking fiber network characterized by flexibility, porosity and integrity. The individual fibers used to compose the nonwoven fabric may be synthetic, naturally occurring, or a combination of the two. The individual fibers may be mechanically, chemically, or thermally bonded to each other. Nonwovens are used commercially for a variety of applications including insulation, packaging (e.g., foods such as meat), household wipes, surgical drapes, medical dressings, and in disposable articles such as diapers, adult incontinent products and sanitary napkins. Tissue is a closely related material in which the individual fibers may or may not be chemically bonded to one another.

The adhesive may be used to attach the topsheet to the backsheet. Alternatively, the adhesive may be used to adhere either the topsheet or the backsheet to other components of the disposable absorbent product, such as tissue layers, leg flaps, fastening ears, tapes, or tabs, or other components typically used to construct a disposable absorbent product that are well known to one skilled in the art.

Those skilled in the art will recognize materials suitable for use as the topsheet and backsheet. Exemplary of materials suitable for use as the topsheet are liquid-permeable materials, such as spunbonded polypropylene or polyethylene having a basis weight of from about 15 to about 25 grams per square meter. Backsheetsz often used in disposable absorbent products are generally prepared from liquid-impermeable materials which function to contain liquids, such as water, urine, menses, or blood, within the absorbent core of the disposable absorbent product and to protect bedding and/or a wears' outer garments from soiling. Materials useful as a backsheet in a disposable absorbent product are generally impermeable to liquid but are permeable to vapor. Examples are liquid-impervious materials such as polyolefin films, e.g., polypropylene and polyethylene, as well as vapor-pervious materials, such as microporous polyolefin films, sometimes referred to as breathable films.

The adhesive of the invention is particularly useful as an elastic attachment adhesive. Materials with excellent stretchability and elasticity are needed to manufacture a variety of disposal and durable articles such as, for example, incontinence pads, disposable diapers, training pants, clothing, undergarments, sports apparel, automotive trim, weather-stripping, gaskets, and furniture upholstery. Stretchability and elasticity are performance attributes that can, for example, function to effectuate a closely conforming fit to the body of a wearer or to the frame of an item. While numerous materials are known to exhibit excellent stress-strain properties and elasticity at room temperatures, it is often desirable for elastic materials to provide a conforming or secure fit during repeated use, extensions and retractions at elevated temperatures such as at body temperatures or in automobile interiors during summer months. The adhesives find particular use as elastic attachment adhesive for use in non-woven applications such as baby diaper or adult incontinence items. In addition to the non-woven markets, the hot melt adhesives of the invention are useful in the packaging, converting and bookbinding markets where the desire is to reduce application temperature and, at the same time, keep the toughness and strength of the adhesive.

Disposable elastic articles are typically composite materials prepared from polymer films, elastomeric fibers, nonwoven sheets and/or absorbent materials by a combination of fabrication technologies. Elastomeric fibers can be prepared by well known processes such as melt- and solution-spinning and winding. Nonwoven sheets can be prepared by spun bonding, melt blowing, hydroentangling, mechanical entangling and the like. Film and sheet forming processes typically involve known extrusion and coextrusion techniques, e.g., blown film, cast film, profile extrusion, injection molding, extrusion coating, and extrusion sheeting. Polymer films are preferably liquid-impervious materials such as polyolefin films, e.g., polypropylene and polyethylene, as well as vapor-pervious materials, such as microporous polyolefin films, sometimes referred to as breathable films.

Durable elastic articles such as, for example, automotive door and window trim, clothing waist-band threads or strips, and building weather-stripping can be made by well-known molding, thermoforming and profile extrusion technologies.

A material is typically considered elastomeric when it is characterized as having a high percent elastic recovery (i.e., a low percent permanent set) after application of a biasing force. Ideally, elastic materials are characterized by a combination of three, temperature independent properties, i.e., a low percent permanent set, a low stress or load at strain, and a low percent stress or load relaxation. That is, there should be at low to elevated service temperatures (1) a low stress or load requirement to stretch the material, (2) no or low relaxing of the stress or unloading while the material is stretched, and (3) complete or high recovery to original dimensions after the stretching, biasing or straining is discontinued. Thus, an elastomeric polymer is typically a polymer which, free of diluents, has a break elongation in excess of 100% independent of any crimp (when in fiber form) and which when stretched to twice its length, held for one minute, and then released, retracts to less than 1.5 times its original length within one minute of being released. Such polymers include, but are not limited to, natural rubber or synthetic rubbers, segmented polyurethanes (including polyurethaneureas) such as poly-etherurethanes and polyesterurethanes, polyetheresters, elastomeric polyethylenes and polypropylenes, and polyetheramides. The article of the invention can comprise substrates comprising such elastomeric polymers in various forms, and such substrates can be used in the process of the invention, provided the benefits of the invention are not adversely affected. The articles of manufacture of the invention can comprise the adhesive and at least one elastomeric substrate such as at least one elastomeric fiber, tape, film, strip, coating, ribbon and/or sheet, and, include substantially linear ethylene polymers and elastomeric substrates such as, for example, spandex (e.g., Lycra® spandex and Lycra® XA, a spandex having little or no lubricating finish thereon). In one embodiment, the substrate comprises spandex or melt spun elastomers. In another embodiment the substrate comprises natural or synthetic rubbers in the form of fibers or in the form of strips less than about 10 mm wide. The adhesive and at least one elastomeric substrate may comprise at least one component of an article of manufacture. Not limiting examples of such components include waistbands, leg bands, bellybands, etc.

The U.S. International Trade Commission defines spandex as a manufactured fiber in which the fiber-forming substance is a long-chain synthetic polymer comprised of at least 85 percent by weight of a segmented polyurethane. Lycra® spandex is known to exhibit nearly ideal, temperature independent elastic properties rendering it very suitable for use in garments, sports apparel and swimsuits.

The invention is further illustrated by the following non-limiting example.

EXAMPLES

In the following examples, all parts are by weight and all temperatures in degrees Fahrenheit unless otherwise noted.

The formulations described herein were prepared in a 600 g Brabender mixer with sigma blades. The block copolymers and about 20% of the oil in the formulation were added to the bowl preheated to about 325° F. Once homogenous, midblock tackifier was added. Finally additional oil and the end block tackifier were added. The blending process ended when the mixture was homogeneous.

The following materials were used to prepare the adhesives:

Soloprene 9618 is a hyper-branched SBS block copolymer available from Dynasol. It has 30% styrene content with melt flow index around 12 g/10 min. following the ISO1133 method. The di-block percentage of this polymer is about 50%.

The coupling efficiency is about 50%.

Kraton 1102, available from Kraton Polymer US, is a block copolymer with about 30% styrene as the end block, and 70% of butadiene polymer as the mid block. The melt flow index of Kraton 1102 is 14 g/10 min. following the ISO1133 method. The di-block percentage of this polymer is about 17%.

Globalprene 166, available from LCY, is a styrene-butadiene-styrene copolymer containing 30% wt styrene, and 70% of butadiene polymer as the mid block. The melt flow index of Globalprene 166 is 6 g/10 min. following the ISO1133 method. The di-block percentage of this polymer is about 5%.

Globalprene 6302, available from LCY Elastomers, is a block copolymer with about 30% styrene as the end block, and 70% of butadiene polymer as the mid block. The melt flow index of Globalprene 6302, is less than 1 g/10 min. following the ISO1133 method. The di-block percentage of this polymer is minimal.

Kraton 1184, available from Kraton Polymer US, is a radial copolymer with about 30% styrene as the end block, and 70% of butadiene polymer as the mid block. The melt flow index of Kraton 1184 is less than 1 g/10 min. following the ISO1133 method. The di-block percentage of this polymer is about 16%.

Kraton MD 6460, available from Kraton Polymers U.S., is a block copolymer with 30% styrene as the end block, and 70% of isoprene and butadiene random copolymer as the mid block. The melt flow index of MD 6460 is 6-11 g/10 min. following the ISO1133 method. The di-block percentage of this polymer is about 30%.

Kraton 1124, available from Kraton Polymer US, is a radial copolymer with about 30% styrene as the end block, and 70% of isoprene polymer as the mid block. The melt flow index of Kraton 1124 is 4 g/10 min. following the ISO1133 method. The di-block percentage of this polymer is 30%.

DPX 593, available from ExxonMobile, is a radial copolymer with about 30% styrene as the end block, and 70% of isoprene polymer as the mid block. The melt flow index of DPX 593 is 11 g/10 min. following the ISO1133 method. The di-block percentage of this polymer is 24%.

Kraton D1162BS, available from Kraton Polymer US, is a block copolymer with about 44% styrene as the end block, and 56% of isoprene polymer as the mid block. The melt flow index of Kraton 1162 is 40 g/10 min. following the ISO1133 method. The di-block percentage of this polymer is 0%.

Vector 4461, available from ExxonMobil Chemical Company, is a block copolymer with about 30% styrene as the end block, and 70% of butadiene polymer as the mid block. The melt flow index of Vector 4461 is 10-16 g/10 min. following the ISO1133 method. The di-block percentage of this polymer is 0%.

Kraton 1101, available from Kraton Polymer US, is a block copolymer with about 31% styrene as the end block, and 69% of butadiene polymer as the mid block. The melt flow index of Kraton 1101 is less than 1 g/10 min. following the ISO1133 method. The di-block percentage of this polymer is about 17%.

Solprene 1205, available from Dynasol Elastomers, is a styrene-butadiene copolymer containing 18% wt styrene.

Plastolyn 240, available from Eastman Chemical Company, is an alpha-methyl styrene end block tackifying resin, which has a Ring and Ball softening point of 117° C. to 123° C.

Eastotac H100, available from Eastman Chemical Company, is a hydrogenated hydrocarbon tackifying resin which has a Ring and Ball softening point of 95° C. to 105° C.

Eastotac H-130R, available from Eastman Chemical Company, is a hydrogenated hydrocarbon tackifying resin which has a Ring and Ball softening point of 125° C. to 135° C.

ECR 179EX is a hydrogenated cycloaliphatic tackifying resin obtained from ExxonMobil Chemical Company. It has a Ring and Ball softening point of 100° C. to 106° C.

Piccolyte HM 106, available from Arizona Chemical, is a styrened terpene resin.

Piccotac 7590, available from Eastman Chemical, is an aromatic modified aliphatic hydrocarbon tackifier having a Ring&Ball softening point of 91-94° C.

Wingtack 86, available from Sartomer, is an aromatic modified aliphatic hydrocarbon tackifier having a Ring&Ball softening point of 84-90° C.

Wingtack 10, available from Sartomer, is an aliphatic hydrocarbon tackifier having a Ring&Ball softening point of 10-15° C. Calsol 5550, available from Calumet Lubricants Company, is a mineral oil.

IRGANOX 1010, available from Ciba Specialty Chemicals, is a hindered phenol type of antioxidant.

Irganox 1726, available from Ciba Specialty Chemicals, is a multifunctional antioxidant.

Test procedures used are described below and in the examples.

Melt viscosities of the hot melt adhesives were determined on a Brookfield Model RVT Thermosel viscometer using a number 27 spindle.

Tensile performance of the hot melt adhesives was determined on 0.125" thick, 2.5" long dogbone shaped portions with 1".times.1" end tabs and a 0.5".times.0.5" central gage portion. These were pulled on an Instron with pneumatic grips at a speed of 12"/min. The breaking stress and the yield stress of the adhesives were then recorded.

Mechanical dynamic performance of the hot melt adhesive was determined by a Rheometrics Dynamic Mechanical Analyzer (Model RDA 700) to obtain the elastic (G') and loss (G") moduli versus temperature. The instrument was controlled by Rhios software version 4.3.2. Parallel plates 8 mm in diameter and separated by a gap of about 2 mm were used. The sample was loaded and then cooled to about −100° C., and the time program started. The program test increased the temperature at 5° C. intervals followed by a soak time at each temperature of 10 seconds. The convection oven containing the sample was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the shear loss modulus (G") were calculated by the software from the torque and strain data. Their ratio, G"/G', also known as the tan delta, was also calculated. The mid-block Tg was taken as the maximum in tan delta. The cross-over temperature is the temperature at which G' and G" are equal to each other and the end block domain starts to flow.

Creep Performance was evaluated by measuring how much a free-end elastic strand retracts under the stretched condition at end-use temperature (100° F.) during a 4-hour period.

The length of a filament (spandex) adhered in the stretched condition between two nonwoven sheets or a nonwoven sheet and a polymeric film was measured ("starting length"). The nonwoven/film and both ends of the spandex were cut and the amount that the resulting free-end filament retracts was measured following a 4 hour period at 100° F. The percent creep was then calculated in the following manner:

$$\% \text{ creep} = \frac{\text{starting length} - \text{final length}}{\text{starting length}} \times 100$$

For example, if the initial distance between marks was 20 cm and the final distance between the marks was 15 cm, the percent creep is 25%. Five samples for each condition were tested and the results averaged for each elastic strand and result recorded.

The formulations tested and the results obtained are shown in Table 1. The adhesive applicator used was a Nordson Spiral spray. Three strands of Lycra Spandex with decitex of 620 were adhered to substrates which contain one 15 gsm spunbond non-woven and one poly-film. The continuous, non-wrapped pattern was used during the adhesive application. The add-on level is 8 mg/in for three strands.

Example 1

In order characterized the types of polymers that can be used in the practice of the invention the molecular weight of the non-diblock polymer and diblock polymer were determined using light scattering molecular weight and GPC molecular weight determinations. The following procedure describes the characterization process.

Sample preparation: 10-15 mg of polymer solid is weighed into a 4 ml vial and then 4 ml of tetrahydrofuran is added. Depending upon the nature of the sample, the solution might be heated up to 50° C. for a few minutes to facilitate dissolving. The solution is then filtered through 0.45 micron PTFE syringe filters. 2 ml of filtered solution is transferred into 2 ml autosampler vials and loaded in carousel, ready for injection.

Instrument set up: The instrument consists an Alliance 2695 HPLC unit from Waters followed by a degasser, and a Shimadzu CTO-10A column oven equipped with 3 PLGel columns with pore size of 100 A, 500 A and mixed bed C and a guard column. Wyatt light scattering detector DAWN DSP and RI detector Optilab DSP are used.

Run conditions: The mobile phase was tetrahydrofuran at 35° C. Flow rate was 1 ml/min. Injection volume for each sample was 100 micron liter.

Data analysis: The GPC molecular weight relative to polystyrene were calculated with Empower® software and the absolute molecular weight were calculated with Astra. The dn/dc was calculated from the integrated area normalized by concentration with polystyrene as the reference. The branching was quantified by two approaches:

1) the ratio of between absolute molecular weight (non-diblock copolymer) to the GPC molecular weight (non-diblock copolymer), the higher this ratio is, the more branching the polymer has;
2) the ratio between peak molecular weight of non-diblock copolymer and that of di-block copolymer. This ratio gives the number of arms for each branching structure.

Example 2

Adhesives were prepared containing 13 wt % of the block copolymer shown in Table 1, 7.00 wt % of Vector 4461, 8.25 wt % Plastolyn 240, 32.50 wt % Eastotac H100, 22.75 wt % of ECR 179EX, 16.50 wt % Calsol 5550 and 0.50 wt % Irganox 1010. The determined light scattering molecular weight (LS MW), GPC molecular weight (GPC MW), ratio of LS MW to GPC MW, diblock LS MW and number of arms of the various block copolymer used in this example are also shown in Table 1.

TABLE 1

| Adhesive formulation | Block co polymer | Polymer type | GPC MW | LS MW | LS MW/ GPC MW | Diblock MW (LS) | Number of arms |
|---|---|---|---|---|---|---|---|
| Sample 1 | Soloprene 9618 | SBS | 504569 | 1052000 | 2.085 | 74215 | 14.2 |
| Sample 2 | Kraton 1102 | SBS | 96500 | 73740 | 0.764 | — | 2* |
| Sample 3 | Sol T 6302 | SBS | 114925 | 107500 | 0.935 | — | 2* |
| Sample 4 | Kraton 1184 | SBS | 232711 | 280100 | 1.204 | 116100 | 2.41 |
| Sample 5 | MD 6460 | SI/BS | 137691 | 165850 | 1.205 | 55420 | 2.99 |
| Sample 6 | Kraton 1124 | SIS | 127674 | 153350 | 1.201 | 68740 | 2.2 |
| Sample 7 | DPX593 | SIS | 133303 | 170950 | 1.282 | 49595 | 3.45 |

*linear triblock

Various properties of the adhesive formulations set forth in Table 1 are shown in Table 2.

TABLE 2

| Adhesive formulation | Viscosity @ 325° F. | G' @40° | Peak tensile (psi) | Tensile yield (psi) | Max. strain | G'/viscosity | Peak stress/viscosity |
|---|---|---|---|---|---|---|---|
| Sample 1 | 2190 | 370140 | 177.1 | 28.7 | 1325 | 1.69 | 8.1 |
| Sample 2 | 3190 | 354300 | 208.6 | 25.8 | 1670 | 1.11 | 6.5 |
| Sample 3 | 3825 | 337780 | 173.2 | 33.8 | 1700 | 0.88 | 4.5 |
| Sample 4 | 10070 | 296460 | 175.3 | 35.9 | 1581 | 0.29 | 1.7 |
| Sample 5 | 2525 | 417320 | 221.8 | 40.0 | 1312 | 1.65 | 8.8 |
| Sample 6 | 2005 | 372920 | 186.4 | 44.2 | 1222 | 1.86 | 9.3 |
| Sample 7 | 1755 | 279700 | 199.8 | 50.1 | 1208 | 1.59 | 11.4 |

From the data it can be seen that Sample 1, which contain hyper-branched SBS block copolymer with higher number of arms, exhibit properties, in particular G'/viscosity at 325° F. and peak tensile/viscosity @325° F., that would ensure more satisfactory performance for non-woven adhesive applications compared to other SBS block copolymer, and approach the performance of SIS.

Example 3

A series of formulations is made using Sol T 9618 as a base polymer with different tackifier system, aiming at making the elastic attachment adhesive. The formulations are listed in Table 3, which also included key mechanical properties, viscosities, and creep performance when used as elastic attachment adhesives. As shown in Table 3, all formulations show acceptable creep performance with reasonably lower viscosity for this type of applications.

Example 4

An adhesive sample (Sample A) was prepared containing 16.9 wt % of Soloprene 9618, 2.5 wt % of Kraton D1162BS, 10.0 wt % of Piccolyte HM 106, 31.6 wt % Eastotac H100, 9.0 wt % Eastotac H-130R, 5.0 wt % of ECR 179EX, 7.6 wt % of Plastolyn 240, 17.4 wt % Calsol 5550 and 0.50 wt % Irganox 1010.

The formulation was applied at 270° F. using spiral pattern to adhere 3 spandex strands with decitex of 620. The add on level was 6 mg/in and 8 mg/in. The creep performance and mechanical properties of this adhesive compared with 34-897B (Sample B), a commercially available elastic attachment adhesive (National Starch and Chemical Company) are shown in Table 4.

TABLE 3

| | 1 | 2 | 3 | 4 |
|---|---|---|---|---|
| Formulation Composition | | | | |
| Sol T 9618 | 18 | 18 | 18 | 18 |
| Plastolyn 240 | 10 | 10 | 10 | 10 |
| Calsol 5550 | 18 | 18 | 18 | 18 |
| Tackifier | 54 | 54 | 54 | 54 |
| Type of Tackifiers | ECR 179EX | Eastotac H100 | Escorez 5400 | Sylvares XR5158 |
| Viscosity at 325° F. (cps) | 1680 | 1710 | 1665 | 1377 |
| Tensile Data | | | | |
| Peak Stress (psi) | 133.3 | 116.7 | 146.3 | 135.5 |
| Yield Stress (psi) | 24.5 | 40.5 | 16.7 | 29.7 |
| Strain at Break (%) | 1533.9 | 1545.6 | 1512.7 | 1597.5 |
| Rheology Data | | | | |
| Tg (Degree C.) | 26.723 | 25.351 | 22.131 | 27.638 |
| G' at 40° C. (dyne/cm$^2$) | 2.65E+05 | 3.67E+05 | 2.03E+05 | 2.22E+05 |
| Creep Performance | | | | |
| Creep with addon of 8 mg/in (%) | 26.7 | 19.1 | 22.7 | 33.6 |

TABLE 4

|  | Sample A | Sample B |
|---|---|---|
| Viscosity @ 275° F. | 6900 | 11900 |
| Peak Tensile Strength (psi) | 187.0 | 190.0 |
| Yield Point (psi) | 47.1 | 46.0 |
| Plateau Modulus (dyne/cm2) | 439060 | 371200 |
| Creep Performance |  |  |
| 8 mg add-on level | 15.6% | 15.0% |
| 6 mg add-on level | 26.0% | 26.0% |

As shown in Table 4, the Sample A formulation gave similar mechanical properties and performance as an elastic attachment adhesive compared to Sample B. The viscosity of sample A was, however, significantly lower.

Figure 1:
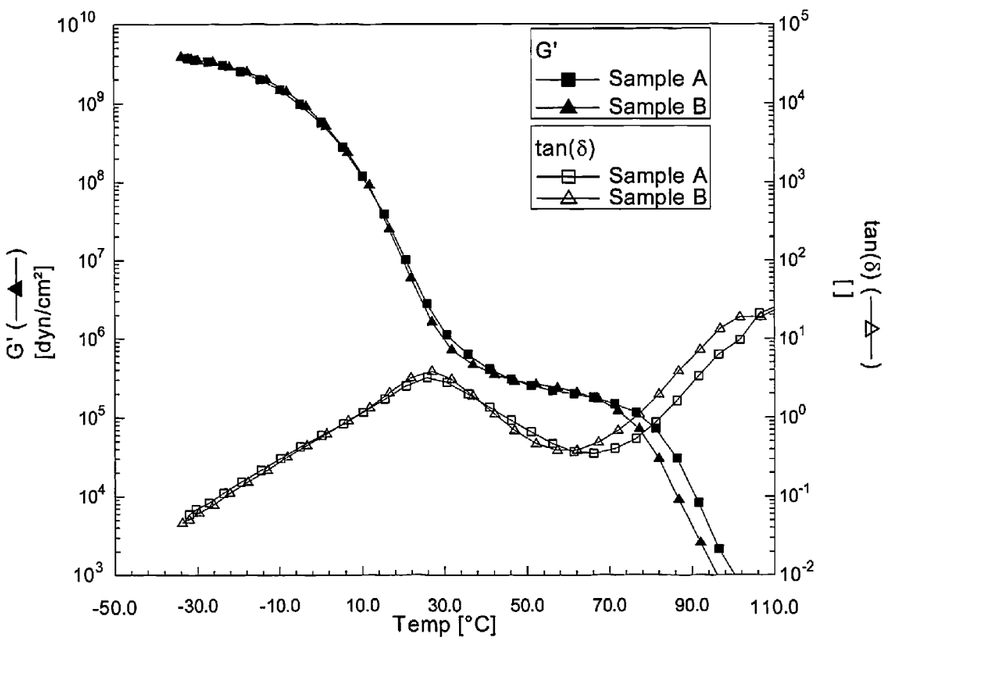
FIG. 1 compares rheology properties of a commercially available elastic attachment adhesive (Sample B) to an adhesive comprising a SBS block copolymer possessing hyper-branched structure (Sample A).

FIG. 1 shows the rheology property comparison between Sample A and Sample B. As show in FIG. 1, these two formulations give almost identical properties at end-use application (40° C.).

Example 5

TABLE 5

| Raw Ingredients | Sample C | Sample D | Sample E |
|---|---|---|---|
| Globalprene 166 | 30 |  |  |
| Kraton D1101 |  | 30 |  |
| Solprene 9618 |  |  | 30 |
| Piccotac 7590 | 42 | 42 | 42 |
| Wingtack 10 | 27.65 | 27.65 | 27.65 |
| Irganox 1726 | 0.35 | 0.35 | 0.35 |
| Total Parts by Weight | 100 | 100 | 100 |
| Viscosity @325° F. | 10100 cps |  | 5190 cps |
| Viscosity @350° F. |  | 23450 cps |  |

A hot melt pressure sensitive formulation in accordance with the invention (Sample E) comprised of 30% hyper branched SBS and other raw ingredients shown in Table 5. For comparison purpose, two other hot melt formulations (Sample C and Sample D) that comprised of non-hyper branched SBS and the same raw ingredients are also shown in Table 5.

Adhesives (Sample E) was characterized and compared to Sample C and Sample D. Viscosity was measured by a Brookfield viscometer using a #27 spindle at 325° F. and 350° F. Softening point was measured by a Mettler FP83 prop Point Apparatus. Each adhesive was coated at 1 mil coat weight to release paper and then was laminated and transferred to a 2 mil Mylar film.

Peel adhesion was measured by performing a 180 degree peel test on a stainless steel panel using an Instron. The 1 mil adhesive specimens in 1"×6" dimension were conditioned at 72° F. and 50% relative humidity for at least 16 hours. Then the adhesive specimens were applied on the stainless steel panel and were rolled over by a 4.5 lb roller. After conditioning the bond for 20 minutes and 24 hours, respectively, the adhesive specimens were peeled from 180 degree at a pulling speed of 12 in/min. The resulted peel strength is recorded as an average load in pounds.

Loop tack was measured using a Loop Tack Tester on a stainless steel panel. The 1 mil adhesive specimens were cut into 1"×5" strips and were conditioned at 72° F. and 50% relative humidity for at least 16 hours. Then the adhesive specimen was folded into a loop by fixing the ends together. The ends of the loop were mounted on the Loop Tack Tester and the loop was brought downwards to contact the stainless steel surface with a very short period of time. The loop was then pulled back and the peak load was recorded as the loop tack in the unit of lb/ln$^2$.

In a shear resistance test, adhesive specimens were cut into 1"×3" strips and were conditioned at 72° F. and 50% relative humidity for at least 16 hours. A 1 inch by 1 inch section of the adhesive specimen was applied to the stainless steel panel. The bond was hung vertically with a weight of 2 kg at 72° F. and 50% relative humidity condition. The time to failure was recorded. The longer time generally indicates better shear resistance and higher cohesive strength.

SAFT is shear adhesion failure temperature. The test has the same sample specimen preparation procedure and a similar testing set up as shear test. Instead of testing at 72° F., the bond was hung in a SAFT oven in which the temperature increased 1° F. per 1 minute. The temperature at which the bond failed was record as the shear adhesion failure temperature in ° F.

Mechanical dynamic performance was determined by a Rheometrics Dynamic Mechanical Analyzer (Model RDA 700) and was described before. The cross-over temperature is defined as the temperature at which G' and G" are equal to each other and the end block domain starts to flow.

Performance results are shown in Table 6.

TABLE 6

| Performance | Sample C | Sample D | Sample E |
|---|---|---|---|
| Softening Point (° F.) | 203.9 | 251.6 | 212.2 |
| Crossover temp (° F.) | 181.4 | 224.2 | 196.7 |
| SAFT (° F.) | 190.1 | 222.6 | 200.2 |
| 20 min 180° peel, PET on SS (Lbf/In) | 5.1 | 5.0 | 6.4 |
| 24 hrs 180° peel, PET on SS (Lbf/In) | 5.3 | 4.9 | 6.0 |
| Loop Tack, PET/SS (lbs) | 2.5 | 3.2 | 5.8 |
| 4 psi shear test, PET/SS (hrs) | >410 | >410 | >410 |

As shown in Table 6, Sample E demonstrated excellent peel adhesion, tack and shear resistance to the stainless steel substrate. Its heat resistance, noted as softening point and SAFT, was much better than Sample C. The high crossover temperature at G'=G" also confirms the good performance of Sample E at high temperature. And more importantly, the viscosity of Sample E was significantly lower. The hot melt adhesive of Sample E is expected to be very useful for tape or high heat resistance label applications.

Sample C had relatively lower softening point and heat resistance. However, its viscosity is still considerably high compared to Sample E.

Sample D showed good peel, tack adhesion as well as excellent heat resistance. However, its viscosity penalty is really high. Its extremely high viscosity has made it unfavorable for hot melt processing.

Example 6

TABLE 7

| Raw Ingredients | Sample F | Sample G |
|---|---|---|
| Solprene 1205 |  | 25 |
| Kraton D1101 | 6 | 8 |
| Solprene 9618 | 27 |  |

TABLE 7-continued

| Raw Ingredients | Sample F | Sample G |
|---|---|---|
| Wingtack 86 | 40.5 | 40.5 |
| Wingtack 10 | 26 | 26 |
| Irganox 1726 | 0.5 | 0.5 |
| Total Parts by Weight | 100 | 100 |
| Viscosity @ 325° F. | 11400 cps | 15900 cps |

Table 7 showed a hot melt pressure sensitive formulation prepared in accordance with the invention (Sample F). For comparison purposes, another hot melt formulation (Sample G) comprised of non-hyper branched SBS polymers and the same raw ingredients also shown in Table 7 was also prepared.

Adhesives (Sample F) was characterized and compared to Sample G. Performance results are shown in Table 8.

TABLE 8

| Performance | Sample F | Sample G |
|---|---|---|
| Crossover temp (° F.) | 198 | 185 |
| SAFT (° F.) | 200 | 170 |
| 20 min 180° peel, PET on SS (Lbf/In) | 7.4 | 7.6 |
| Loop Tack, PET/SS (lbs) | 3.7 | 4.4 |
| 4 psi shear test, PET/SS (hrs) | 100 | 38 |

As shown in Table 8, Sample F demonstrated good pressure sensitive performance such as high peel adhesion and high shear resistance to the stainless steel substrate. Its heat resistance, noted as SAFT and crossover temperature, was much better than Sample G. And more importantly, the viscosity of Sample F was significantly lower than Sample G. Results show that the hot melt adhesive of Sample F would be very useful for tape or high heat resistance label applications.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A hot melt adhesive comprising from about 18 to about 40 wt %, based on the total weight of the adhesive, of a hyper-branched polystyrene-polybutadiene-polystyrene (SBS) block copolymer having (i) at least about 13 arms and (ii) a di-block percentage of from about 25% to about 75% and a tackifying resin, wherein said hyper-branched SBS is characterized in having a ratio between light-scattering molecular weight (of non-di-block polymer) and GPC molecular weight (of non-di-block polymer) greater than 1.4 and having ratio between light scattering molecular weight molecular weight (of non-di-block polymer) and light scattering molecular weight molecular weight (of di-block polymer) greater than 5, and wherein the weight average molecular weight of each arm of the hyper-branched SBS block copolymer is less than about 100,000 wherein said hot melt adhesive application temperature ranges from about 250° F. to about 325° F. and said hot melt adhesive shear adhesion failure temperature is at least 10° F. higher than a hot melt adhesive without the hyper-branched SBS.

2. The adhesive of claim 1 wherein the weight average molecular weight of each arm of the hyper-branched SBS block copolymer is between about 20,000 to about 80,000.

3. The adhesive of claim 1 further comprising a linear, or radial, or random block copolymer.

4. The adhesive of claim 3 wherein the hyper-branched SBS block copolymer has a di-block percentage of less than about 50%.

5. The adhesive of claim 1 wherein the styrene content of the hyper-branched SBS block copolymer is from about 20 wt % to about 50 wt %.

6. The adhesive of claim 5 which is pressure sensitive adhesive.

7. The adhesive of claim 3 wherein the linear, radial or random block copolymer is selected from the group consisting of styrene-isoprene-styrene, styrene-butadiene-styrene, styrene-isobutylene styrene, styrene-b-ethylene/butylene-b-stryrene, styrene-b-ethylene/propylene-b-styrene, styrene-butadiene random copolymer and combinations thereof.

8. The adhesive of claim 1 wherein the hyper-branched SBS block comprises at least about 14 arms.

9. The adhesives of claim 1 further comprising a wax.

10. The adhesive of claim 1 further comprising a liquid plasticizer.

11. An article of manufacture comprising the hot melt adhesive of claim 1 and a substrate.

12. The article of claim 11 wherein said substrate comprises an elastomeric fiber.

13. The article of claim 11 wherein said substrate is a nonwoven substrate.

14. The article of claim 12 which is a disposable elastic article.

15. The article of claim 13 which is a diaper.

16. The article of claim 11 wherein said substrate is a packaging substrate.

17. The article of claim 11 which is a pressure sensitive adhesive article.

18. The article of claim 17 which is a tape or label.

* * * * *